United States Patent
Caldwell et al.

(10) Patent No.: US 9,042,708 B2
(45) Date of Patent: May 26, 2015

(54) DIGITAL VIDEO RECORDING AND PLAYBACK OF USER DISPLAYS IN A PROCESS CONTROL SYSTEM

(75) Inventors: John M. Caldwell, Austin, TX (US);
Marty J. Lewis, Cedar Park, TX (US);
Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 895 days.

(21) Appl. No.: 12/415,732

(22) Filed: Mar. 31, 2009

(65) Prior Publication Data

US 2010/0247082 A1 Sep. 30, 2010

(51) Int. Cl.
*H04N 5/92* (2006.01)
*G05B 23/02* (2006.01)

(52) U.S. Cl.
CPC .................................. *G05B 23/0264* (2013.01)

(58) Field of Classification Search
USPC ......... 386/117, 230, 239, 248, 235, 326, 241; 348/86
See application file for complete search history.

(56) References Cited

U.S. PATENT DOCUMENTS

| | | |
|---|---|---|
| 5,577,186 A | 11/1996 | Mann, II et al. |
| 6,298,454 B1 | 10/2001 | Schleiss et al. |
| 6,647,315 B1 | 11/2003 | Sherriff et al. |
| 7,272,531 B2 | 9/2007 | Kavaklioglu et al. |
| 2002/0075244 A1* | 6/2002 | Tani et al. ..................... 345/173 |
| 2002/0113877 A1* | 8/2002 | Welch ........................... 348/148 |
| 2008/0147604 A1* | 6/2008 | Bulow .............................. 707/3 |

FOREIGN PATENT DOCUMENTS

| | | |
|---|---|---|
| CN | 1409247 A | 4/2003 |
| JP | 63-190491 A | 8/1988 |
| JP | 7-182208 A | 7/1995 |
| JP | 07-325990 | 12/1995 |
| JP | 11-051706 | 2/1999 |
| JP | 2000-242327 A | 9/2000 |
| JP | 2001-084032 A | 3/2001 |
| JP | 2002-182889 A | 6/2002 |
| JP | 2003-076420 A | 3/2003 |

(Continued)

OTHER PUBLICATIONS

Search Report for Application No. GB1005018.5, dated Jun. 25, 2010.

(Continued)

*Primary Examiner* — Mohammad A Siddiqi
(74) *Attorney, Agent, or Firm* — Marshall, Gerstein & Borun LLP

(57) ABSTRACT

A process control system user display provides a display image containing control system information. The system may include a digital recording module including an image capture module for making a real-time digital recording of at least a portion of the display image, the image capture module buffering a terminal portion of the real-time digital recording. A storage module may store at least a portion of the real-time digital recording. A real-time digital recording may contain at least a portion of the display image, wherein, at any particular time, the real-time digital recording includes information from the control system for a predetermined duration proximate the particular time, and at least a portion of the real-time digital recording may be stored. A desired portion of the digital recording may be played back, optionally with process control system event and/or continuous history.

48 Claims, 8 Drawing Sheets

(56) References Cited

FOREIGN PATENT DOCUMENTS

| JP | 2003-186385 | A | 7/2003 |
|---|---|---|---|
| JP | 2004-199444 | A | 7/2004 |
| JP | 2006-350681 | A | 12/2006 |
| WO | WO-02/073413 | A2 | 9/2002 |

OTHER PUBLICATIONS

"Longwatch Video System," *Video Historian*™, Data Sheet 2 pages (2008).

Epiphan Systems Inc., "Epiphan Frame Grabber User Guide," (2009). Retrieved from the Internet on Aug. 29, 2011: URL:http://www.epiphan.com/pdf/frame_grabber_user_quide.pdf.

Lotus Development Corporation, "ScreenCam 1-15 Producer: Lights Camera Software in Action—Reviewers Guide," (1999). Retrieved from the Internet on Aug. 29, 2011: URL:ftp://ftp.software.ibm.com/ftn/lotusweb/product/screencam/scpbetarevgd2.pdf.

Urmetzer et al., "Usability Evaluation in Task Orientated Collaborative Environments," Computational Science A ICCS, pp. 792-798 (2007).

Extended European Search Report for Application No. 10158535.4, dated Sep. 13, 2011.

European Examination Report for Application No. 10158535.4-1239, dated Sep. 28, 2012.

Examination Report for Great Britain Application No. 1005018.5, dated Apr. 15, 2014.

Chinese Office Action in corresponding Chinese Application No. 201010151409.5, dated Nov. 5, 2013.

Office Action for Japanese Patent Application No. 2010-072121, mailed Feb. 4, 2014.

Examination Report for Great Britain Application No. 1005018.5, dated Oct. 13, 2014.

English-language translation of JP 2001-84032, referenced by the Examiner in the Interview Summary dated Aug. 20, 2014, and Applicants in the Information Disclosure Statement filed on Mar. 27, 2014.

Office Action for European Patent Application No. 10158535.4, dated Jan. 30, 2015.

Examination Report for Great Britain Application No. 1005018.5, dated Mar. 6, 2015.

\* cited by examiner

DIGITAL VIDEO RECORDING AND PLAYBACK OF USER DISPLAYS IN A PROCESS CONTROL SYSTEM

TECHNICAL FIELD

The present invention relates generally to process control systems and, more particularly, to techniques and apparatus for digitally recording video output shown at user displays in a process control system.

BACKGROUND

Process control systems, like those used in chemical, petroleum, or other processes, typically include a centralized process controller communicatively coupled to at least one host or operator workstation and to one or more field devices via analog, digital, or combined analog/digital buses. The field devices, which may be, for example valves, valve positioners, switches and transmitters (e.g., temperature, pressure, and flow-rate sensors), perform functions within the process such as opening or closing valves and measuring process parameters. The process controller receives signals indicative of process measurements made by the field devices and/or other information pertaining to the field devices, uses this information to implement a control routine, and then generates control signals which are sent over the buses to the field devices to control the operation of the process. Information from the field devices and the controller is typically made available to one or more applications executed by the operator workstation to enable an operator to perform desired functions with respect to the process, such as viewing the current state of the process, modifying the operation of the process, etc.

When a plant incident occurs, such as, for example, when a critical operating condition or process control parameter value is exceeded, or plant safety is compromised, or other abnormal situations develop in the process control system, operating personnel must analyze process control system information to determine the likely cause of the incident and to evaluate the operator's response to the incident. Typically this investigation involves careful analysis of entries in event journals (such as detailed information regarding alarms and operator changes to the process control system made in response to the alarms) and process data that is automatically collected and stored in a data historian. This analysis can be very time-consuming and does not provide all of the information needed to recreate the situation that gave rise to the plant incident. In particular, control systems typically do not permit review of exactly what an operator saw on a console, or how the operator navigated to information that he or she thought was relevant, and then ultimately what action the operator took (or did not take) in attempting to resolve the incident.

Further, when plant operators experience problems operating a plant, they generally are required to document the problem and report to appropriate personnel. Often, however, the information necessary to document the problem is difficult to obtain and may not be easily re-created. Often, a significant amount of time is required to document, investigate, understand, and, when necessary, re-create the problem.

In addition, many entities using process control systems seek to improve their operational performance by formulating standard operating procedures (SOP's) to be performed by plant personnel in the event of any number of operating conditions that a plant operator may encounter during operation of a process control system. Such SOP's normally are maintained as standard text documents in plant manuals for reference by personnel responsible for operating the process control system.

Still further, in order for companies to grow and adapt to changing workforce demographics, it is important to capture and retain operating knowledge developed by plant personnel and to transfer that operating knowledge to other plant personnel as well as to new employees. Operator training programs often employ process control simulators and/or on-the-job training alongside more experienced operators. Off-line process control simulators permit a wide variety of training scenarios to be defined in order to capture important operating conditions that may confront an operator. With on-the-job training, however, an operator may not experience all possible operating conditions of a process control system for a long time.

SUMMARY

A process control system advantageously may be provided with a capability to make a real-time digital video recording of a display image provided on one or more user displays within a process control system and to store one or more portions of the real-time digital video recording.

In one embodiment, a digital recording module may be provided for a process control system having at least a first user console with a user display adapted for providing a display image containing information acquired from the process control system. Such a digital recording module may include an image capture module for making a real-time digital recording of at least a portion of the display image provided via the user display of the first user console, said portion containing at least some of the information acquired from the process control system, wherein the image capture module is adapted to buffer a terminal portion of the real-time digital recording; and a storage module coupled to the image capture module for storing at least a portion of the real-time digital recording. The storage module may continually store a terminal portion of the real-time digital recording on a first-in, first-out basis. The image capture module may be configured to make a real-time digital recording of at least a portion of the display image provided via one or more user consoles in addition to or instead of the first user console, and the storage module may be adapted to store at least a portion of the real-time digital recording for each user console.

The image capture module and the storage module may comprise software executable on the user console or another console, or the image capture and storage capabilities may be implemented in a separate hardware component which may be coupled to a user console or any other suitable component of a process control system.

The digital recording module may be usable in a process control system that includes a plurality of user consoles, wherein each user console has a respective user display adapted for providing a respective display image containing information acquired from the process control system, and wherein the real-time digital recording made by the image capture module includes a recording of at least a portion of the respective display image provided via each of the plurality of user displays.

The digital recording module may additionally or alternatively be usable in a process control system that includes a plurality of user consoles, wherein each user console has a respective user display adapted for providing a respective display image containing information acquired from the process control system, and wherein each of the plurality of user displays includes an image capture module that makes a real-time digital recording that includes a recording of at least a portion of the respective display image provided via that user display.

When the digital recording module receives an indication from the process control system that a predetermined event has occurred, the storage module may store at least a portion of the real-time digital recording encompassing or proximate the occurrence of the predetermined event. In this connection, predetermined events may include, for example, that a process control limit has been exceeded, that a control system operator or other user of the control system (e.g., a supervisor, engineer, etc.) modifies a process control parameter via the user console, that an alarm condition exists in the process control system, or, in embodiments comprising a control module adapted to receive user input specifying at least one user-definable event, the predetermined event may be that the process control system or an application running within the process control system detects that at least one of the user-definable events has occurred and sets a corresponding parameter or otherwise signals the digital recording module that the event has been detected. The control module may further be adapted to receive user input specifying a recording duration corresponding to each user-definable event, and when the process control system detects that one of the user-definable events has occurred, the storage module may store a portion of the real-time digital recording having a duration equal to the recording duration corresponding to that user-definable event. The real-time digital recording may also include audio information detected while the event was occurring in real-time, such as via a microphone located at the user console, for example.

The digital recording module may further comprise an editing module for including at least one of audio, textual, and graphical information within the real-time digital recording and/or may comprise a playback module adapted to receive input identifying a portion of the real-time digital recording stored by the storage module and to provide via a display the identified portion of the real-time digital recording. The playback module may be adapted to provide, in response to a command from a user, a synchronized combination of at least a portion of the real-time digital recording and at least one of video, event, and continuous history.

The process control system may have an event historian including a plurality of event records, each event record corresponding to a respective one of a plurality of events, and the playback module may be adapted to receive input identifying one of the plurality of events and to provide via the display a portion of the real-time digital recording stored by the storage module that corresponds to the identified one of the plurality of events.

In another embodiment, a process control system for controlling a process, comprises at least a first user console with a user display adapted for providing a display image containing information acquired from the process control system; an image capture module for making a real-time digital recording of at least a portion of the display image provided via the user display of the first user console, said portion containing at least some of the information acquired from the process control system, wherein the image capture module is adapted to buffer a terminal portion of the real-time digital recording; and a storage module coupled to the image capture module for storing at least a portion of the real-time digital recording.

In yet another embodiment, a process control system having at least a first user console with a user display adapted for providing a display image containing information acquired from the process control system may be operated by making a real-time digital recording of at least a portion of the display image provided via the user display of the first user console, said portion containing at least some of the information acquired from the process control system and storing at least a portion of the real-time digital recording. At any particular time, the real-time digital recording may include the information acquired from the process control system for a predetermined duration prior to the particular time.

DETAILED DESCRIPTION

Figure 1:
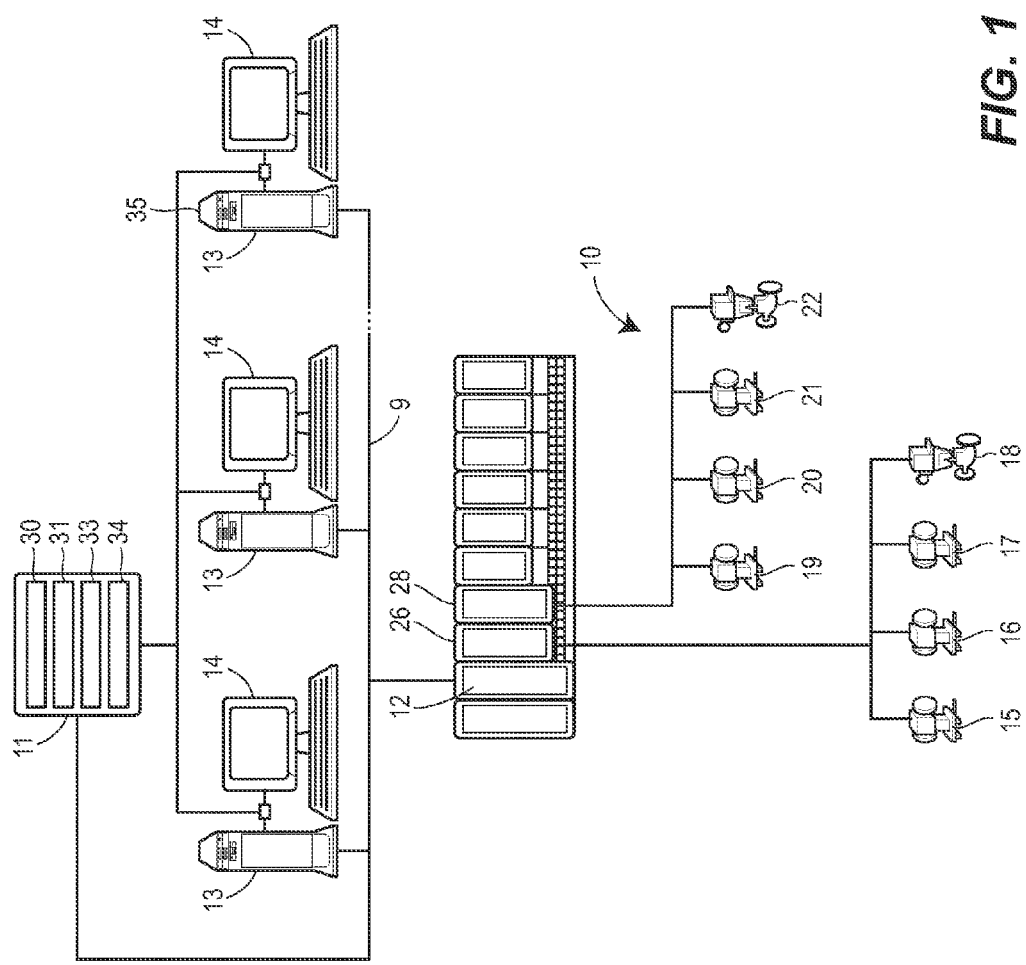
FIG. 1 illustrates an exemplary process control system in which a digital video recording of user display may be made.

As shown in FIG. 1, an exemplary process control system 10 in which a digital video recording of user displays may be made may include a process controller 12 connected to one or more host workstations or computers 13, which may be, for example, any type of personal computer or workstation), each having a display screen 14, and also connected to field devices 15-22 via input/output (I/O) cards 26 and 28. A plurality of workstations or computers 13 may be interconnected via a network 9 as shown in FIG. 1. The controller 12, which may be, for example, the DeltaV™ controller sold by Fisher-Rosemount Systems, Inc., is communicatively connected to the host computers 13 via, for example, an Ethernet connection and is also communicatively connected to the field devices 15-22 using any desired hardware and software associated with, for example, standard 4-20 ma devices and/or any smart communication protocol such as the Fieldbus protocol. The controller 12 implements or oversees a process control routine stored therein or otherwise associated therewith and communicates with the devices 15-22 and the host computers 13 to control a process in any desired manner.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26, while the field devices 19-22 are smart devices, such as Fieldbus field devices, that communicate over a digital bus to the I/O card 28 using Fieldbus protocol communications. Of course, the field devices 15-22 could conform to any other desired standard(s) or protocol(s) besides the Fieldbus protocol, including any standards or protocols developed in the future.

The controller 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform either an input function, such as that associated with a transmitter, a sensor, or any other process parameter measurement device, or a control function, such as that associated with a control routine that performs PID, fuzzy logic, etc. control, or an output function which controls the operation of some device, such as a valve, to perform some physical function within the process control system 10. Of course hybrid and other types of function blocks exist and may also be used for the control strategy of the controller 12. Function blocks may be stored in and executed by the controller 12, which is typically the case when these function blocks are used for, or are associated with, standard 4-20 ma devices and some types of smart field devices, or they may be stored in and implemented by the field devices themselves, which is the case with Fieldbus devices. While the control system 10 described herein employs a function-block control strategy, the control strategy could alternatively or additionally be implemented or designed using other conventions, such as ladder logic, for example.

A digital recording module 11, which may comprise a software program or collection of software programs residing in, for example, one or more user consoles such as the one or more computers 13 of the process control system 10, or may comprise an independent hardware component coupled in the process control system 10 as shown, may include a hardware-based or software-based image capture module 30 capable of making a real-time digital recording of the display image provided via the displays 14 one or more of the computers 13, or at least a portion of that display image containing information acquired by the one or more computers 13 from the process control system 10. As shown, the digital recording module 11 is coupled to the process control system 10 via the network 9 in order to access event and continuous history of the process control system 10 and also is coupled to access a video signal of each host computer 13, for example, via a video card output of each host computer 13 or via an external video coupler on the display screen 14 of each host computer 13.

The image capture module 30 may be configured to buffer a terminal portion of the real-time digital recording such that, at any given time, the real-time digital recording made for the most recent period of time (i.e., the terminal portion) is available for display or storage, either in its entirety or in part. In this sense, the real-time digital recording may comprise a circular buffer, retaining the most recent portion of the display image and thus the most recent events occurring within the process control system. The digital recording module 11 also may include a storage module 31 coupled to the image capture module 30 for storing at least a portion of the real-time digital recording. The image capture module 30 and the storage module 31 may be implemented either in software executable on one or more of the user consoles or computers 13 or in hardware interfacing with one or more computers 13 and/or other devices in the process control system 10, for example. Optionally, the storage module 31 may continually store a terminal portion of the real-time digital recording on a first-in, first-out basis.

Each user console or computer 13 may have a respective user display 14 adapted for providing a respective display image containing information acquired from the process control system 10 or any of the controllers therein, and the real-time digital recording may be made by a centralized image capture module 30 and may include a recording of at least a portion of the respective display images provided via each respective user display 14 as shown in FIG. 1. Alternatively, each computer 13 may have its own image capture module 30 that makes a separate real-time digital recording that includes a recording of at least a portion of the respective display image provided via the user display 14 of that computer 13 and/or via the user display 14 of one or more other computers 13. A real-time digital recording may in fact include all or only some information entered at, or otherwise received by, one or more computers 13 of the process control system 10. Optionally, the real-time digital recording module 11 may be configured to include any conventional application software display information acquired from a process control system in an operator-usable fashion on the user display 14 and allows the user to make changes to parameter settings within the process control system as necessary, and those changes are then logged into the process control system.

Whether the image capture functionality is centralized or distributed, when digital recording module 11 receives an indication from the process control system 10 that a predetermined event has occurred, the storage module 31 may be configured to automatically store at least a portion of the real-time digital recording encompassing or proximate the occurrence of the predetermined event. Such predetermined events may include, for example, the exceeding of a process control limit, the modification by an operator of a process control parameter via a computer 13, the existence of a high-priority or other alarm condition in the process control system 10, a safety shut-down of the process control system 10, or even the occurrence of a user-definable event specified via input received from an operator of the process control system 10. The real-time digital recording proximate the occurrence of the each such predetermined event may be configured to include all or portions of the display images of any or all of the computer 13 of the process control system 10, as desired.

The digital recording module 11 may be adapted to receive user input specifying a respective recording duration corresponding to each such user-definable event, and when the digital recording module 11 detects that one of the user-definable events has occurred, the storage module 31 may store a portion of the real-time digital recording having the respective recording duration corresponding to that user-definable event. A time-based offset may be associated with some events, such that the detection of an event may trigger the storing a buffered portion of the real-time digital recording that begins prior to the occurrence of the event (corresponding to a negative offset), or the storing of a portion that begins after the event occurs (corresponding to a positive offset), or the storing of a portion that begins concurrently with the occurrence of the event (corresponding to a zero offset). In any case, as noted above, the portion of the real-time digital recording stored for a particular event may encompass a time proximate (whether before, during, or after) the occurrence or detection of the particular event. By way of illustration, when a detected event is a system shut-down, the portion of the real-time digital recording that may be of primary interest may be that which shows what happened to cause the system shutdown (i.e., a portion that begins before the event). When an event does not lead to a system shutdown, an operator's response to the event during the ensuing time may be of more interest, in which case the portion of the real-time digital recording may begin concurrently with or after the detection of the event.

The digital video recording module 11 also may provide a "Save" function that allows an operator to manually store a video segment of any desired duration for any desired computers 13, independently of the occurrence of any event.

The real-time digital recording may include an operator's verbal comments or other audio information detected at the computer 13 while the user display 14 provides the display image. Further, the digital recording module 11 may include an editing module 33 for including audio, textual and/or graphical information in the real-time digital recording.

The digital recording module 11 may comprise a playback module 34 adapted to receive input identifying a portion of the real-time digital recording stored by the storage module 31 and to provide via a display (e.g., a user display 14 or other suitable display) the identified portion of the real-time digital recording and, if desired, event information retained by an event historian and/or a continuous historian of the process control system 10, which may reside in a server, a user console, or any other suitable device of the process control system 10.

Still further, a computer 13 may have an event historian 35 associated therewith that contains a plurality of event records, each event record corresponding to a respective one of a plurality of events, and the playback module 34 may be adapted to receive input identifying one of the plurality of events and to provide via the display a portion of the real-time digital recording stored by the storage module 31 that corresponds to the identified one of the plurality of events. In this regard, the playback module 34 is adapted to synchronize playback of the digital video recording for one or more user consoles with the process control system event and a portion of a process control system continuous history record corresponding to the event.

After an event occurs in a process control system, the real-time digital recording may be used to review information seen by an operator during the event and steps taken by the operator in response to the event while it was occurring, facilitating communication among plant personnel and reducing the time and cost associated with correcting plant operational problems identified by reviewing operator handling of events using the real-time digital recording.

Figure 2:
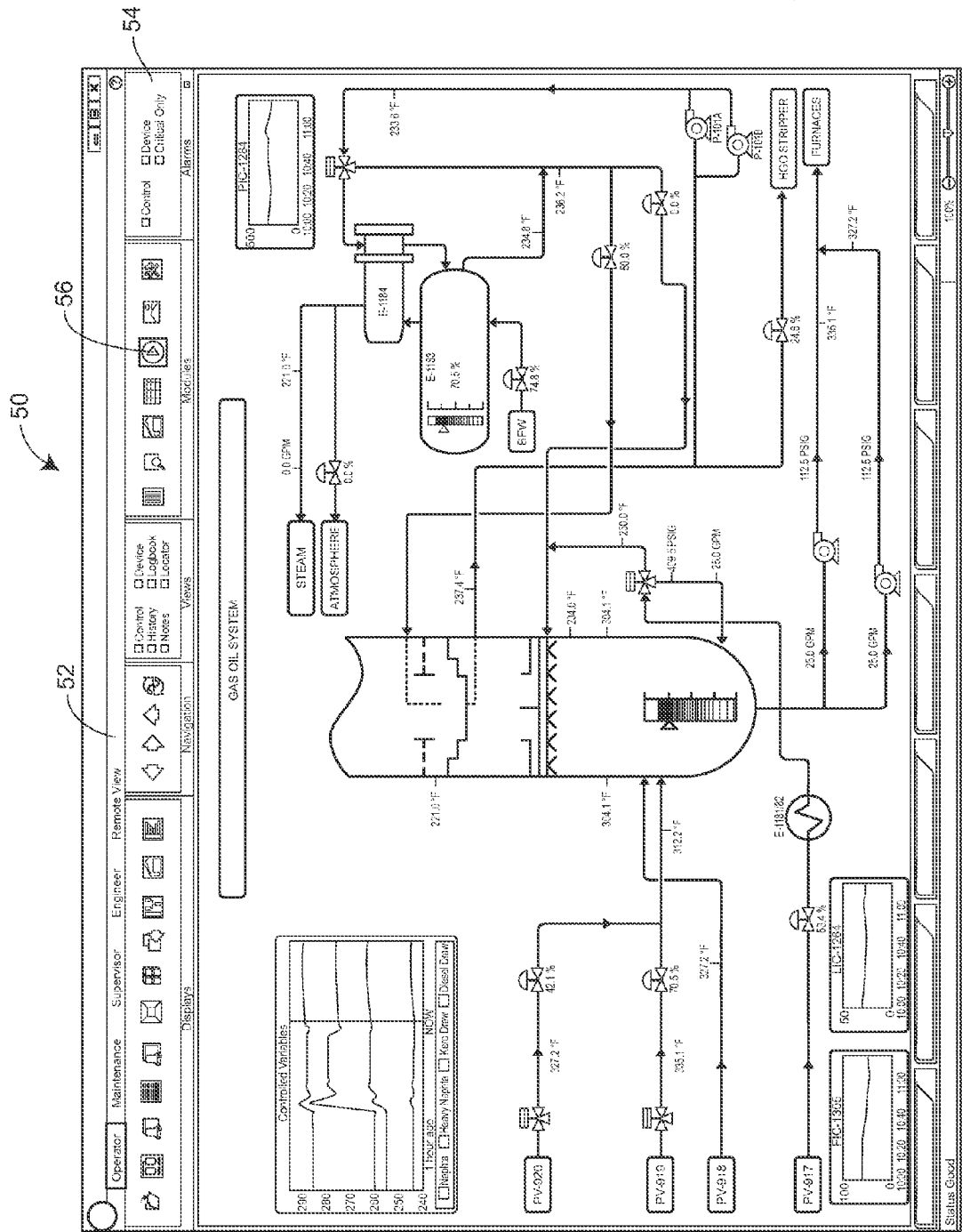
FIG. 2 illustrates an exemplary screen display that may be recorded by a digital video recording module in a process control system such as shown in FIG. 1.

FIG. 2 depicts a screen shot of an exemplary screen display 50 that may be presented to an operator such as via the user display 14 during operation of the process control system 10 and may be captured and stored in whole or in part by the digital video recording module 11 described herein. The illustrated screen display 50 graphically depicts a symbolic representation of an exemplary gas oil system and related control elements and devices. Of course, the digital video recording functionality described herein may be used in conjunction with any process control system controlling any desired process instead of the illustrated gas oil system.

Figure 3:
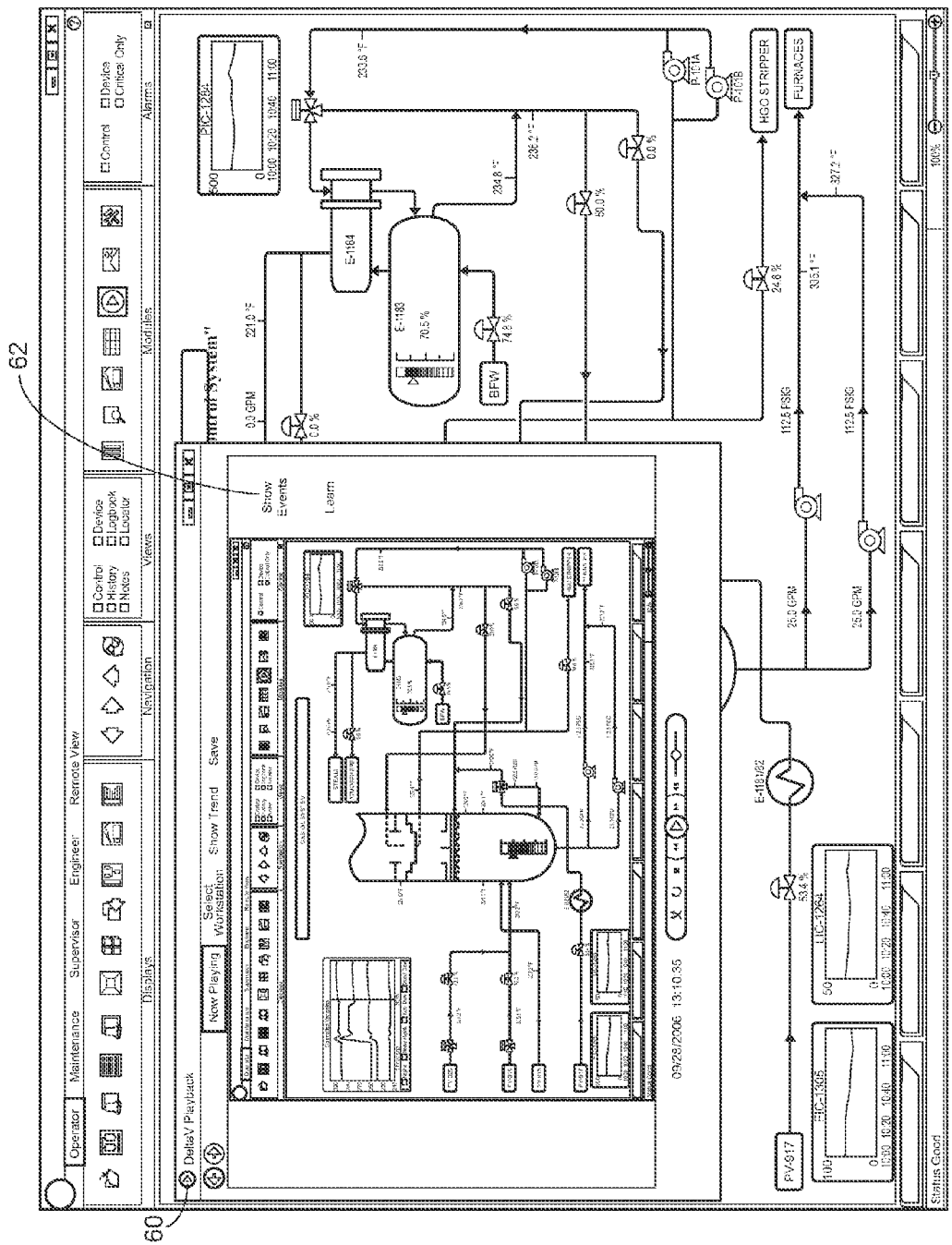
FIG. 3 illustrates another exemplary screen display including an overlaid playback module window.

Extending across the top of the screen display 50 shown in FIG. 2 are a menu bar 52 and a toolbar 54. The toolbar 54 includes, among other things, a playback button 56 which, when clicked or otherwise activated by an operator or other user, may activate a playback module window 60, as shown in FIG. 3. More particularly, as shown in FIG. 3, the illustrated playback module window 60 may comprise another window that may overlie the screen display 50 on the user display 14 and may contain controls for playing back the real-time digital recording of the display image, or a portion thereof, as described below in further detail. Alternatively, the playback module 34 may run independently of the computer 13. For example, a supervisor analyzing a previously saved recording likely would do so at a console other than the computer 13 to avoid disturbing an operator using the computer 13.

Figure 4:
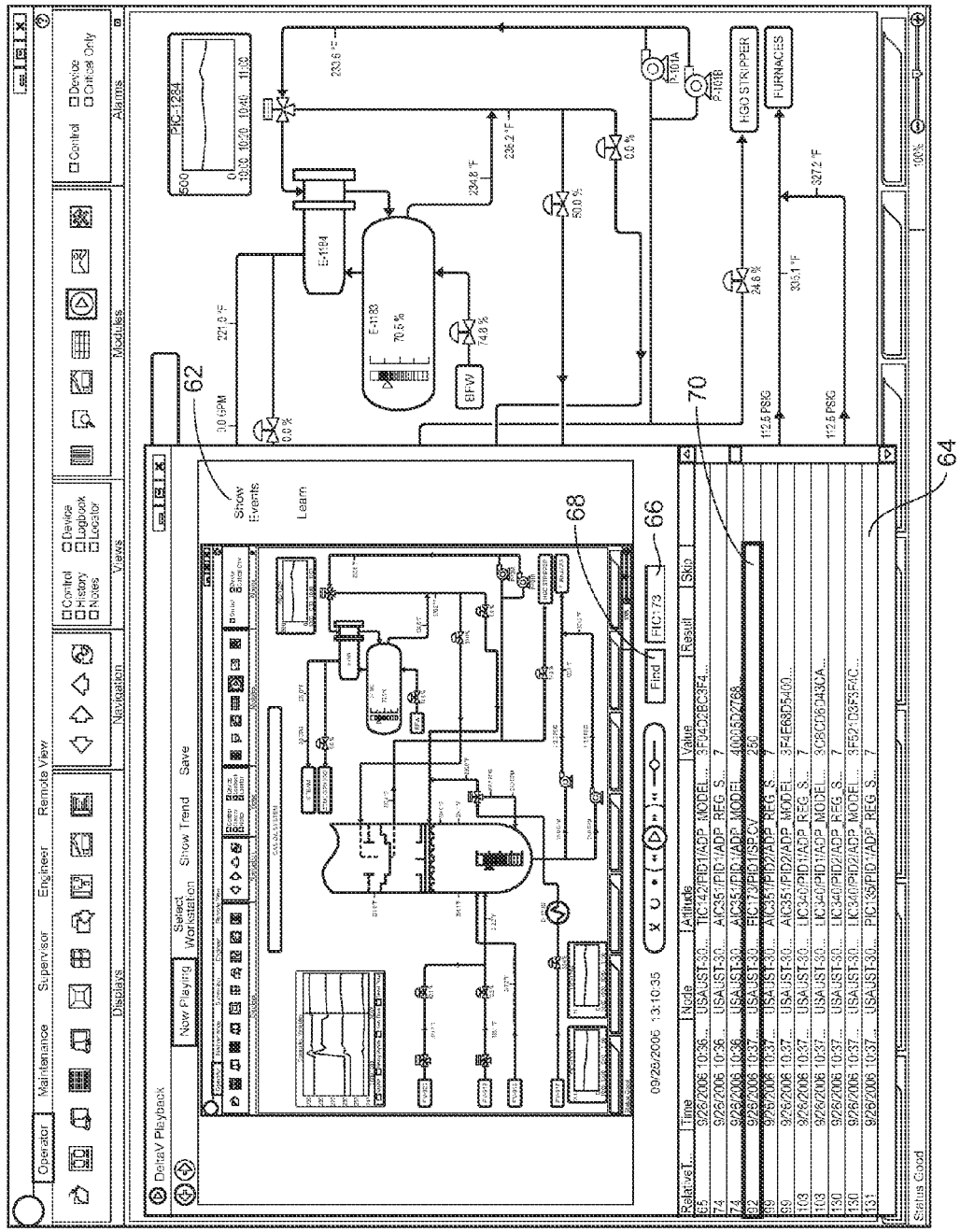
FIG. 4 illustrates an exemplary screen display including a log of recorded events.

A "Show Events" button 62 may be provided, as shown in FIG. 3, and when an operator pushes or clicks the Show Events button 62, an event log (i.e., a listing, maintained in the event historian 35 of the process control system, of events that occurred concurrently with the recording of the portion of the real-time digital recording being played back) may be displayed in an extension area 64 of the playback module window 60 as shown in FIG. 4. The event log may be used, for example, to initiate playback of a portion of the real-time digital recording associated with a selected one of the events in the event log.

Optionally, a capability to search the event log may be provided. For example, as shown in FIG. 4, when the event log is displayed in the extension area 64, a search query box 66 may be presented in the playback module window 60 for accepting entry of input by an operator or other user of a search query comprising a string of alphanumeric characters to be searched for within the event log. A "Find" button 68 is provided that, when pushed or clicked, initiates a search of the event log for the next entry within the event log that contains the string of alphanumeric characters entered by the operator or user. As shown, the first event record in the event log that contains the search query, indicated by the reference numeral 70 in FIG. 4, is highlighted with a colored background after the Find button 68 is activated. The search capability may further permit each succeeding activation of the Find button 68 to continue the search and highlight the next successive event record in the event log that contains the search query.

Figure 5:
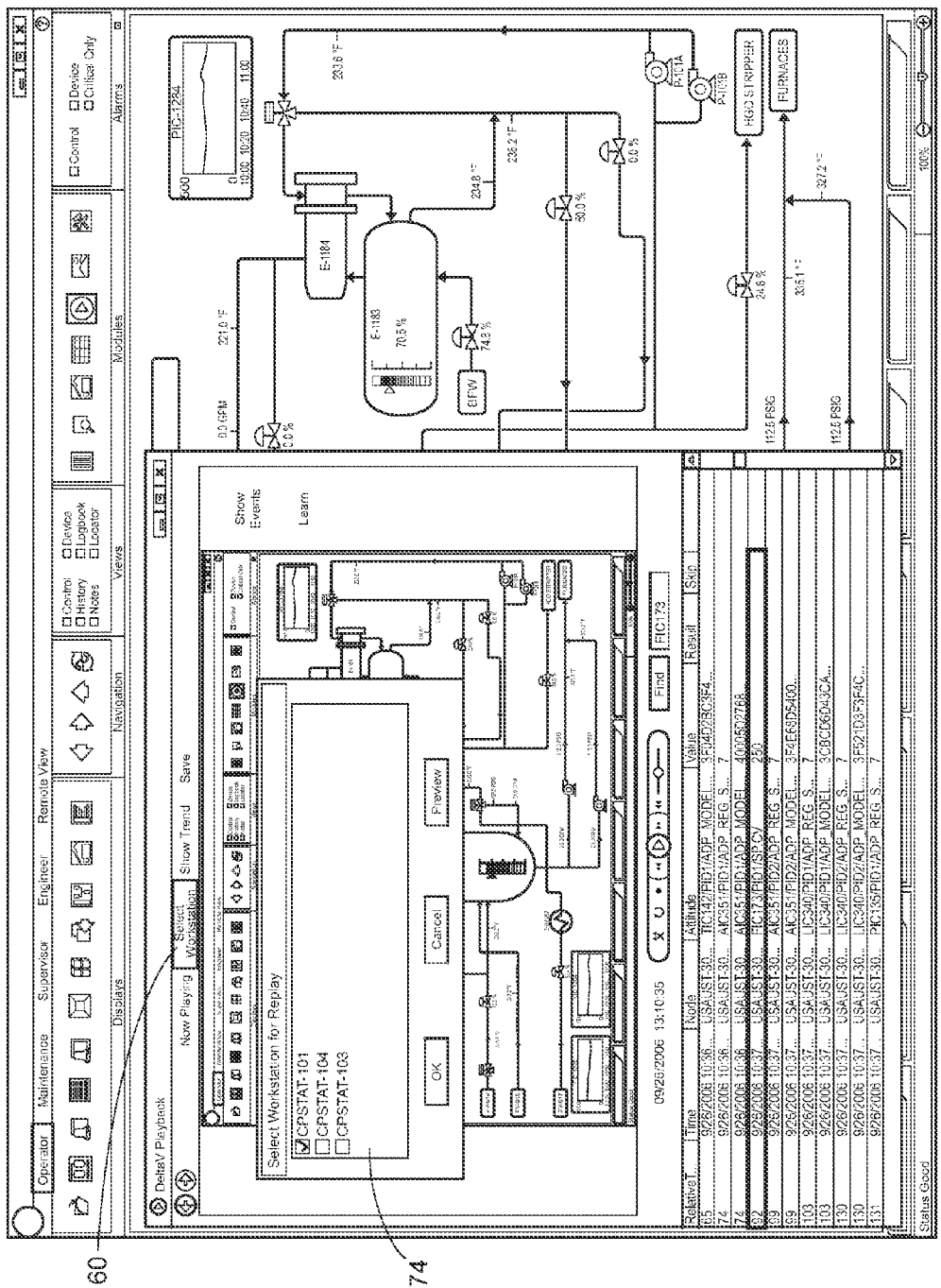
FIG. 5 illustrates an exemplary screen display including a overlaid workstation selection window which may be used to select a workstation for replay.

As shown in FIG. 5, the playback module window 60 also may include a "Select Workstation" button or tab 72 which, when pushed or clicked, causes the screen display 50 to present a workstation selection window 74, which overlies the playback module window 60 in FIG. 5. The workstation selection window 74 may display a list of the computers 13 operating in the process control system 10 which have digital video recordings available for replay to the operator or other user by means of digital video recording techniques. A check box may be provided adjacent each entry in the list of computers 13 which the operator or user may check or uncheck to select one or more computers 13 for which display or replay is desired, either sequentially or simultaneously. The user's selections may be implemented by simply clicking an "OK" button 76 in the workstation selection window 74. Means also may be provided to permit the operator user to select from among the digital video recordings stored for the selected computer(s) 13 the one or more recordings desired for replay. For example, each recording may have an associated timestamp or other suitable designation by which the user can selected recordings for replay.

Figure 6:
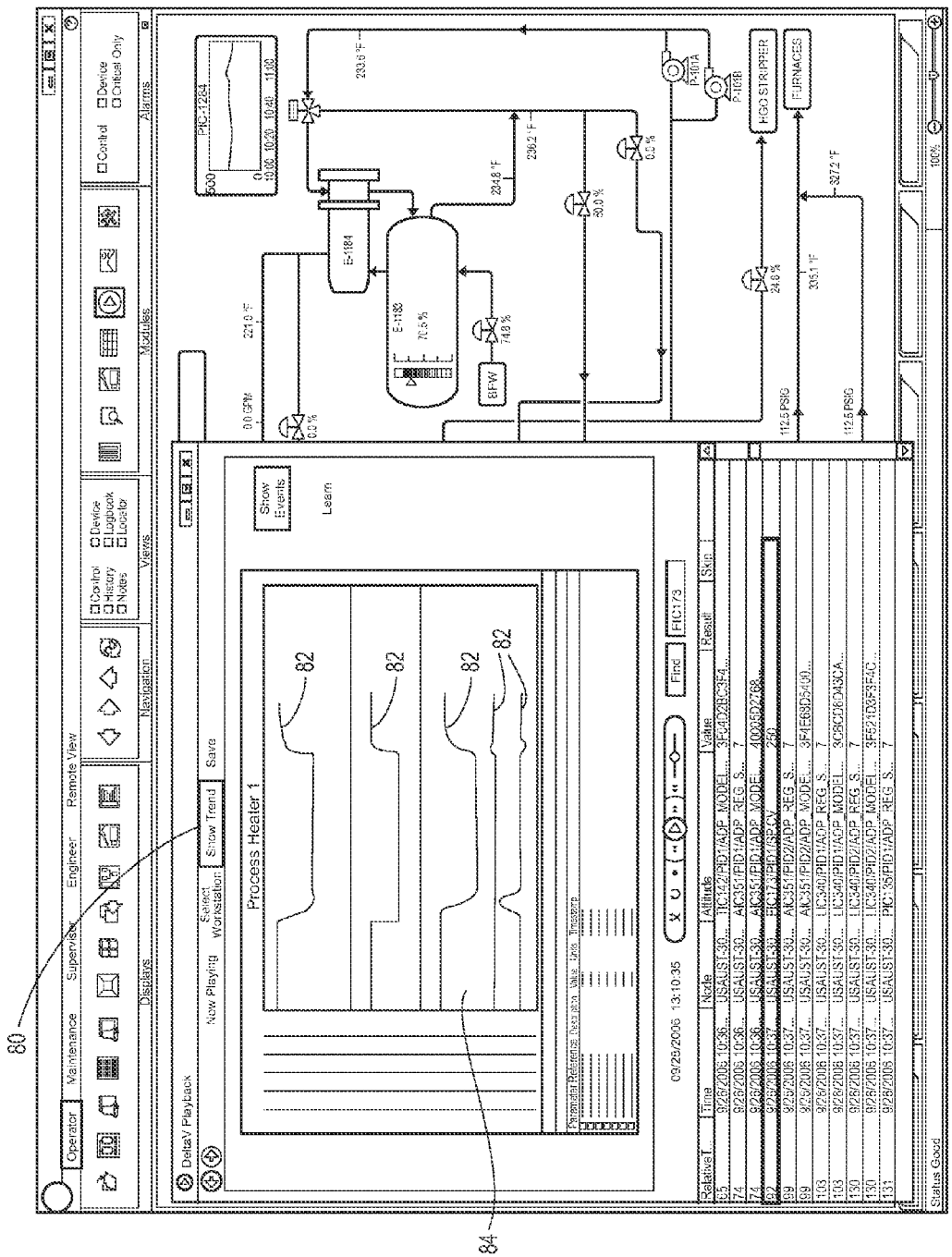
FIG. 6 illustrates an exemplary screen display including a display of historical trends in conjunction with a digital video recording.

As shown in FIG. 6, the playback module window 60 also may include a "Show Trend" button or tab 80 which, when pushed or clicked, causes the playback module window 60 to retrieve from the continuous historian of the process control system 10 and display, either separately from or synchronously with the digital video recording, a graphical representation of trends for selected process control variables or other values measured within the process control system 10 during the time period when the digital video recording was made. As shown, a plurality of such graphical trend representations 82 may be shown concurrently within a trend window 84 within the playback module window 60. These trends may be informative, for example, when evaluating events that occur during operation of the process control system and the handling of those events by a plant operator. In addition to such trend data, a user also may simultaneously view digital video recording from one or more computers 13, event data, and continuous historian data.

Figure 7:
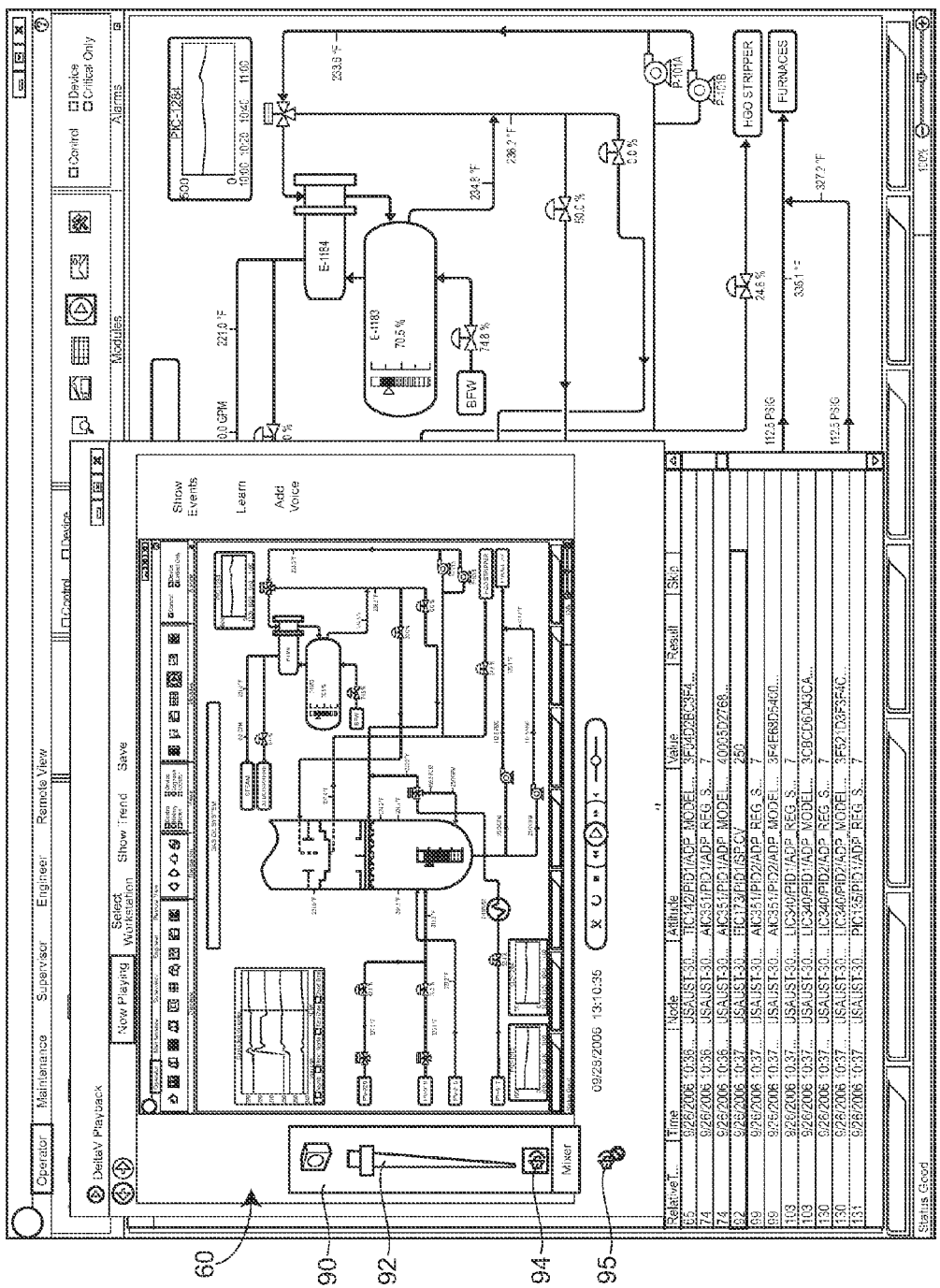
FIG. 7 illustrates an exemplary screen display that may be used in a digital video recording module to provide an audio recording in conjunction with a digital video recording.

FIG. 7 illustrates an audio playback capability with which audio recorded in the control room or elsewhere during operation of the process control system 10 may be re-played concurrently with display of the digital video recording shown within the playback module window 60. An audio control 90 may be provided with a volume adjustment slider control 92 and a "Mute" button 94 with which the operator or user can adjust the playback volume or mute the recorded audio during playback by clicking on a speaker icon 95 in the playback module window 60.

Figure 8:
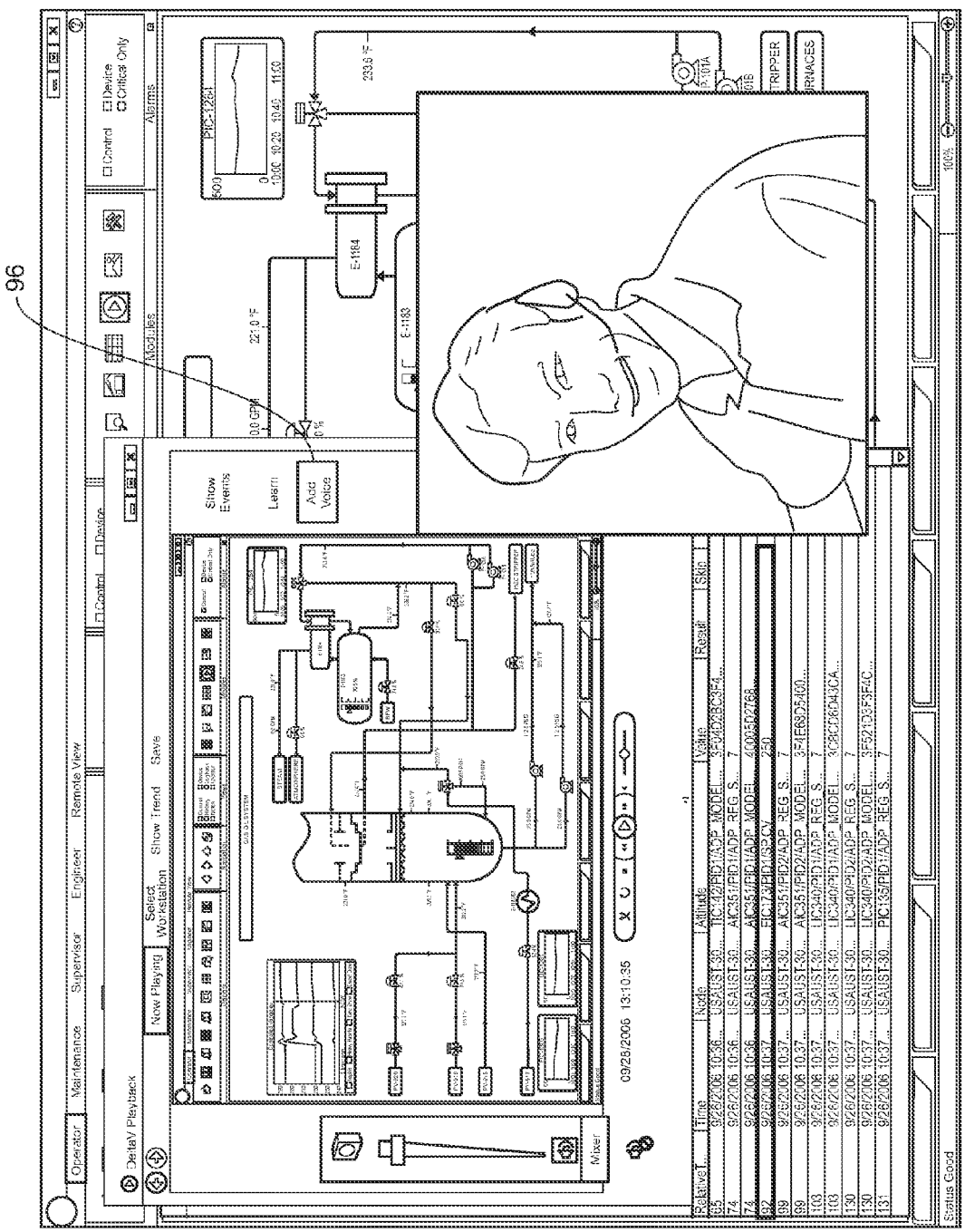
FIG. 8 illustrates an exemplary screen display including a voice-over control for adding audio voice-over to recorded events.

As shown in FIG. 8, an "Add Voice" button 96 may be provided which, when pressed or clicked, permits the operator or user to include contemporaneous narration, supplemental voice-over, or other audio material to a recording corresponding to a recorded event so that the operator or user may verbally elaborate on the recorded event and/or the actions taken in response to the event, either during the event or afterward, to better document plant conditions prevailing at the time a real-time digital video recording was made. For this purpose, a microphone and optional headset may be provided for use by the operator or user at the computer 13 as depicted in FIG. 8.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A digital recording system for a process control system of a process plant, the digital recording system comprising:
    an image capture hardware device including a physical interface for receiving video data, to receive video data representing a real-time digital recording of at least a portion of a display output provided via a user display of a first user interface for the process control system, said portion containing at least some information acquired from the process control system, wherein the image capture hardware device is adapted to buffer a terminal portion of the video data representing the real-time digital recording;
    a data historian coupled to the process control system to store process event data representing a process event associated with process activities in the process plant and external to the first user interface, the process activities detected or manipulated by a process control device; and
    a memory coupled to the image capture hardware device to store the video data so that the real-time digital recording of the portion of the display output provided via the user display of the first user interface is retrievable for playback in a manner that is synchronized to a reference time utilized by the data historian to store the process event data, wherein a temporal relationship is determinable between:
        a time at which the recorded display output, represented by the video data, was provided via the user display of the first user interface, and
        a time at which the process event, represented by the process event data, occurred.

2. The digital recording system of claim 1, wherein the image capture hardware device comprises software executable on the image capture hardware device.

3. The digital recording system of claim 1, usable in a process control system that includes a plurality of user interfaces, each user interface having a respective user display adapted for providing a respective display output containing information acquired from the process control system, wherein the video data representing the real-time digital recording made by the image capture hardware device includes video data representing a recording of at least a portion of the respective display output provided via each of the plurality of user displays.

4. The digital recording system of claim 1, usable in a process control system that includes a plurality of user interfaces, each user interface having a respective user display adapted for providing a respective display output containing information acquired from the process control system, wherein each of the plurality of user displays includes an image capture hardware device that identifies video data representing a real-time digital recording that includes a recording of at least a portion of the respective display output provided via that user display.

5. The digital recording system of claim 1, wherein when the digital recording system receives an indication from the process control system that a predetermined event has occurred the memory stores at least a portion of the video data representing the real-time digital recording proximate the occurrence of the predetermined event.

6. The digital recording system of claim 5, wherein the predetermined event is that a process control limit has been exceeded.

7. The digital recording system of claim 5, wherein the predetermined event is that an operator modifies a process control parameter via the user interface.

8. The digital recording system of claim 5, wherein the predetermined event is that an alarm condition exists in the process control system.

9. The digital recording system of claim 5, further comprising a control module, executable on the first user interface, adapted to receive operator input specifying at least one user-definable event, and wherein the predetermined event is that the first user interface detects that at least one of the user definable events has occurred.

10. The digital recording system of claim 9, wherein the control module is further adapted to receive operator input specifying a record duration corresponding to each user-definable event, and wherein, when the digital recording system detects that one of the user definable events has occurred, the memory stores a portion of the video data representing the real-time digital recording having the record duration corresponding to that user-definable event.

11. The digital recording system of claim 1, wherein the video data representing the real-time digital recording includes audio information detected at the user interface while the user display provides the display output.

12. The digital recording system of claim 1, further comprising an editing module for including at least one of audio, textual, and graphical information in the video data representing the real-time digital recording.

13. The digital recording system of claim 1, further comprising a playback module, executable on the first user interface, adapted to provide, in response to a command from a user, a synchronized combination of at least a portion of the video data representing the real-time digital recording and at least one of video, event, and continuous history.

14. The digital recording system of claim 1, further comprising a playback module, executable on the first user interface, adapted to receive input identifying a portion of the video data representing the real-time digital recording stored by the memory and to provide via a display the identified portion of the video data representing the real-time digital recording.

15. The digital recording system of claim 14, wherein the process event data stored on the data historian includes a plurality of event records, each event record corresponding to a respective one of a plurality of events, and wherein the playback module is adapted to receive input identifying one of the plurality of events and to provide via the display a portion of the video data representing the real-time digital recording stored by the memory that corresponds to the identified one of the plurality of events.

16. The digital recording system of claim 1, wherein the memory continually stores a terminal portion of the video data representing the real-time digital recording on a first-in, first-out basis.

17. A process control system for controlling a process, comprising:
a first user interface display to provide a display output containing information acquired from the process control system;
a data historian to store process event data representing a process event associated with process activities in the process plant and external to the first user interface, the process activities detected or manipulated by a process control device;
a computer, communicatively connected to the first user interface display, including one or more processors and a memory storing instructions that, when executed by the one or more processors, cause the one or more processors to:
identify video data representing a real-time digital recording of at least a portion of a display output provided via the first user interface display, said portion containing at least some of the information acquired from the process control system, wherein the computer is adapted to buffer a terminal portion of the video data representing the real-time digital recording, and
store the video data so that the real-time digital recording of the portion of the display output provided via the first user interface display is retrievable for playback in a manner that is synchronized to a reference time utilized by the data historian to store the process event data, wherein a relationship is determinable between:
a time at which the recorded display output, represented by the video data, was provided via the first user interface display, and
a time at which the process event, represented by the process event data, occurred.

18. The process control system of claim 17, wherein the computer identifies the video data via a network interface.

19. The process control system of claim 17, including a plurality of user interface displays adapted for providing a respective display output containing information acquired from the process control system, wherein the video data representing the real-time digital recording made by the computer includes a recording of at least a portion of the respective display output provided via each of the plurality of user interface displays.

20. The process control system of claim 17, including at least one additional user interface display adapted for providing a display output containing information acquired from the process control system, wherein the additional user interface display is communicatively connected to a computer that identifies video data representing a real-time digital recording that includes a recording of at least a portion of the display output provided via the user interface display.

21. The process control system of claim 17, wherein, when the computer receives an indication from the process control system that a predetermined event has occurred, the computer stores at least a portion of the video data representing the real-time digital recording proximate the occurrence of the predetermined event.

22. The process control system of claim 21, wherein the predetermined event is that a process control limit has been exceeded.

23. The process control system of claim 21, wherein the predetermined event is that an operator modifies a process control parameter via the computer.

24. The process control system of claim 21, wherein the predetermined event is that an alarm condition exists in the process control system.

25. The process control system of claim 21, wherein the computer further comprises a control module, stored as a set of instructions to the computer memory, adapted to receive operator input specifying at least one user definable event, and wherein the predetermined event is that the computer detects that at least one of the user- definable events has occurred.

26. The process control system of claim 25, wherein the control module is further adapted to receive operator input specifying a record duration corresponding to each user-definable event, and wherein, when the digital recording module detects that one of the user-definable events has occurred, the computer stores a portion of the video data representing the real-time digital recording having the record duration corresponding to that user-definable event.

27. The process control system of claim 17, wherein the video data representing the real-time digital recording includes audio information detected at the computer while the user interface display provides the display output.

28. The process control system of claim 17, further comprising an editing module, stored as a set of instructions to the computer memory, for including at least one of audio, textual, and graphical information in the video data representing the real-time digital recording.

29. The process control system of claim 17, further comprising a playback module, stored as a set of instructions to the computer memory, adapted to provide, in response to a command from a user, a synchronized combination of at least a portion of the video data representing the real-time digital recording and at least one of video, event, and continuous history.

30. The process control system of claim 17, further comprising a playback module, stored as a set of instructions to the computer memory, adapted to receive input identifying a portion of the video data representing the real-time digital recording stored by the memory and to provide via a display the identified portion of the video data representing the real-time digital recording.

31. The process control system of claim 30, wherein the process event data stored by the event historian includes a plurality of event records, each event record corresponding to a respective one of a plurality of events, and wherein the playback module is adapted to receive input identifying one of the plurality of events and to provide via the display a portion of the video data representing the real-time digital recording stored by the memory that corresponds to the identified one of the plurality of events.

32. The process control system of claim 17, wherein the memory continually stores a terminal portion of the video data representing the real-time digital recording on a first-in, first-out basis.

33. A method of operating a process control system for a process plant, the method comprising:
identifying video data representing a real-time digital recording of at least a portion of a display output provided via a user display of a first user interface for the process control system, said portion of the display output containing at least some information acquired from the process control system, wherein at any particular time the video data includes information acquired from the process control system for a predetermined duration prior to the particular time;
storing, via a data historian of the process control system, process event data representing a process event relating to process activities in a process plant and external to the first user interface, the process activities having been detected or manipulated by a process control device in the process plant; and
storing at least a portion of the video data so that the real-time digital recording of the portion of the display output provided via the user display of the first user interface is retrievable for playback in a manner that is synchronized with a reference time utilized by the data historian to store the process event data, wherein a temporal relationship is determinable between:
a time at which the recorded display output, represented by the portion of video data, was provided via the user display of the first user interface, and
a time at which the process event, represented by the process event data, occurred.

34. The method of claim 33, wherein the process control system includes at least a second user interface with a user display adapted for providing a second display output containing information acquired from the process control system, the method further comprising the steps of identifying video data representing a real-time digital recording of at least a portion of the second display output and storing at least a portion of the video data representing the real-time digital recording of the second display output.

35. The method of claim 33, wherein, when an indication is received from the process control system that a predetermined event has occurred, at least a portion of the video data representing the real-time digital recording proximate the predetermined event is stored.

36. The method of claim 35, wherein the predetermined event is that a process control limit has been exceeded.

37. The method of claim 35, wherein the predetermined event is that an operator modifies a process control parameter via the user interface.

38. The method of claim 35, wherein the predetermined event is that an alarm condition exists in the process control system.

39. The method of claim 35, further comprising the step of receiving operator input specifying at least one user-definable event, and wherein the predetermined event is that the user interface detects that at least one of the user definable events has occurred.

40. The method of claim 33, further comprising the step of including in the video data representing the real-time digital recording audio information detected at the user interface while the user display provides the display output.

41. The method of claim 33, further comprising the step of including at least one of audio, textual, and graphical information in the video data representing the real-time digital recording.

42. The method of claim 33, further comprising the step of providing, in response to a command from a user, a synchronized combination of at least a portion of the video data representing the real-time digital recording and at least one of video, event, and continuous history.

43. The method of claim 33, further comprising the steps of receiving input identifying a portion of the video data representing the real-time digital recording and providing via a display the identified portion of the video data representing the real-time digital recording.

44. The method of claim 43, further comprising the steps of providing an event historian including a plurality of event records, each event record corresponding to a respective one of a plurality of events; receiving input identifying one of the plurality of events; and providing via the display a portion of the video data representing the real-time digital recording that corresponds to the identified one of the plurality of events.

45. The method of claim 33, wherein the step of storing the video data representing the real-time digital recording includes the step of continually storing a terminal portion of the digital recording on a first-in, first-out basis.

46. A digital recording system for a process control system having at least a first user interface with a user display to provide a display output containing information acquired from the process control system, the digital recording system comprising:
an image capture hardware device including a physical interface for receiving video data, to receive video data representing a real-time digital recording of at least a portion of the display output provided via the user display of the first user interface, said portion containing at least some of the information acquired from the process control system, wherein the image capture hardware device is adapted to buffer a terminal portion of the video data representing the real-time digital recording;
a data historian coupled to the process control system to store process event data associated with process activities external to the first user interface;
a memory coupled to the image capture hardware device to store the video data representing the real-time digital recording of the portion of the display output provided via the user display of the first user interface in a database in a manner that is synchronized with the process event data stored in the data historian so that the real-time digital recording has a temporal relationship with the process event data;
wherein when the digital recording system receives an indication from the process control system that a predetermined event has occurred the memory stores at least a portion of the video data representing the real-time digital recording proximate the occurrence of the predetermined event; and
wherein the predetermined event is that a process control limit has been exceeded.

47. A process control system for controlling a process, comprising:
a first user interface display to provide a display output containing information acquired from the process control system;

a data historian to store process event data associated with process activities external to the first user interface; and a computer, communicatively connected to the first user interface display and including one or more processors and a memory storing instructions that, when executed by the one or more processors, cause the one or more processors to:

identify video data representing a real-time digital recording of at least a portion of the display output provided via the first user interface display, said portion containing at least some of the information acquired from the process control system, wherein the computer is adapted to buffer a terminal portion of the video data representing the real-time digital recording, and store the video data representing the real-time digital recording of the portion of the display output provided via the first user interface display in a database in a manner that is synchronized with the process event data stored in the data historian so the real-time digital recording has a temporal relationship with the process event data stored in the data historian;

wherein, when the computer receives an indication from the process control system that a predetermined event has occurred, the computer stores at least a portion of the video data representing the real-time digital recording proximate the occurrence of the predetermined event; and wherein the predetermined event is that a process control limit has been exceeded.

48. A method of operating a process control system having at least a first user interface with a user display adapted for providing a display output containing information acquired from the process control system, the method comprising the steps of:

identifying video data representing a real-time digital recording of at least a portion of the display output provided via the user display of the first user interface, said portion containing at least some of the information acquired from the process control system, wherein at any particular time the video data representing the real-time digital recording includes the information acquired from the process control system for a predetermined duration prior to the particular time; and storing at least a portion of the video data representing the real-time digital recording of the portion of the display output provided via the user display of the first user interface in a database in a manner that is synchronized with process event data stored by a data historian coupled to the process control system so that the real-time digital recording has a temporal relationship with the process event data, the process event data relating to process activities external to the first user interface;

wherein, when an indication is received from the process control system that a predetermined event has occurred, at least a portion of the video data representing the real-time digital recording proximate the predetermined event is stored; and wherein the predetermined event is that a process control limit has been exceeded.

* * * * *